United States Patent
Shin et al.

(10) Patent No.: US 9,969,398 B2
(45) Date of Patent: May 15, 2018

(54) SYSTEM AND METHOD FOR CONTROLLING LDC VOLTAGE OF HYBRID VEHICLE

(71) Applicants: Hyundai Motor Company, Seoul (KR); Kia Motors Corporation, Seoul (KR)

(72) Inventors: Dong Jun Shin, Gyeonggi-do (KR); Soung Han Noh, Gyeonggi-do (KR); Jun Yeon Park, Gyeonggi-do (KR); Chang Ryeol Yoo, Incheon (KR); Hwan Hwang, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days. days.

(21) Appl. No.: 14/960,351

(22) Filed: Dec. 5, 2015

(65) Prior Publication Data
US 2016/0368480 A1    Dec. 22, 2016

(30) Foreign Application Priority Data
Jun. 22, 2015    (KR) .................. 10-2015-0088269

(51) Int. Cl.
*B60W 10/08*     (2006.01)
*B60W 30/182*    (2012.01)
(Continued)

(52) U.S. Cl.
CPC ......... *B60W 30/18127* (2013.01); *B60L 7/14* (2013.01); *B60L 11/12* (2013.01);
(Continued)

(58) Field of Classification Search
CPC ...... B60W 20/14; B60W 10/06; B60W 10/08; B60W 30/182; B60W 2510/244; B60W 2710/06; B60W 2710/08; Y10S 903/93
(Continued)

(56) References Cited

U.S. PATENT DOCUMENTS

| | | | |
|---|---|---|---|
| 6,583,599 B1* | 6/2003 | Phillips | B60K 6/485 320/103 |
| 2008/0091314 A1* | 4/2008 | Hayashi | B60K 6/48 701/22 |

(Continued)

FOREIGN PATENT DOCUMENTS

| | | |
|---|---|---|
| JP | 2008-114835 A | 5/2008 |
| KR | 10-2009-0059175 | 6/2009 |

(Continued)

OTHER PUBLICATIONS

U.S. Appl. No. 14/860,956, filed Sep. 22, 2015, Dong Jun Shin et al.

*Primary Examiner* — Redhwan K Mawari
*Assistant Examiner* — Rodney P King
(74) *Attorney, Agent, or Firm* — Mintz Levin Cohn Ferris Glovsky and Popeo, P.C.; Peter F. Corless

(57) ABSTRACT

A system and method for controlling a low-voltage DC-DC converter (LDC) voltage of a hybrid vehicle are provided. The LDC voltage is optimally adjusted based on which driving mode the vehicle enters, thereby improving fuel efficiency. The method includes determining whether the hybrid vehicle is driven in a regenerative braking mode and whether a value of a state of charge (SOC) of an auxiliary battery is equal to or greater than a first critical value set as a value when charging of the auxiliary battery is unnecessary during the driving in the regenerative braking mode. When the value of the SOC of the auxiliary battery is equal to or greater than the predetermined first critical value, the driving (Continued)

mode is switched from the regenerative braking mode to an electric vehicle (EV) mode, and to variably adjust an LDC target voltage in the EV mode.

12 Claims, 4 Drawing Sheets

(51) Int. Cl.
 B60W 10/06 (2006.01)
 B60W 30/18 (2012.01)
 B60L 11/12 (2006.01)
 B60L 7/14 (2006.01)
 B60L 11/18 (2006.01)
 B60L 15/20 (2006.01)
 B60W 20/20 (2016.01)

(52) U.S. Cl.
 CPC ....... B60L 11/1862 (2013.01); B60L 11/1868 (2013.01); B60L 15/2009 (2013.01); B60L 2210/10 (2013.01); B60L 2240/423 (2013.01); B60W 20/20 (2013.01); B60W 2510/244 (2013.01); B60W 2510/246 (2013.01); Y02T 10/645 (2013.01); Y02T 10/7005 (2013.01); Y02T 10/7044 (2013.01); Y02T 10/7066 (2013.01); Y02T 10/7077 (2013.01); Y02T 10/7216 (2013.01); Y02T 10/7275 (2013.01); Y10S 903/93 (2013.01)

(58) Field of Classification Search
 USPC .......................................................... 701/22
 See application file for complete search history.

(56) References Cited

U.S. PATENT DOCUMENTS

| | | | |
|---|---|---|---|
| 2010/0089672 A1* | 4/2010 | Lee | B60L 7/16 180/65.275 |
| 2012/0141895 A1* | 6/2012 | Kwon | H01M 8/04037 429/429 |
| 2014/0167680 A1* | 6/2014 | Park | H02J 7/0054 320/104 |

FOREIGN PATENT DOCUMENTS

| | | |
|---|---|---|
| KR | 10-2012-0012522 A | 2/2012 |
| KR | 10-2012-0031609 | 4/2012 |
| KR | 10-2013-0082360 A | 7/2013 |
| KR | 10-2014-0142559 | 12/2014 |

* cited by examiner

| Mode classification | Energy flow | Calculation of efficiency |
|---|---|---|
| EV Mode<br><br>Motor Power > threshold | $\eta E$ — Engine ---> $\eta M$ — Motor ---> $\eta B$ — Battery<br>Motor ---> LDC ---> Vehicle<br>Motor ---> Wheel<br>LDC ---> 12V Batt ($\eta L$) | • $\eta E \times \eta M \times \eta B_{chg} \times \eta B_{dch} \times \eta L$<br>= 30%×90%×95%×95%×90%<br>= 22% |
| Charging mode during driving<br><br>Motor Power > threshold<br>&<br>Fuel Injection = 1 | $\eta E$ — Engine ---> $\eta M$ — Motor ---> $\eta B$ — Battery<br>Motor ---> LDC ---> Vehicle<br>Motor ---> Wheel<br>LDC ---> 12V Batt ($\eta L$) | • $\eta E \times \eta M \times \eta L$<br>= 30%×90%×90%<br>= 24% |
| Regenerative braking mode<br><br>Motor Power > threshold<br>&<br>Fuel Injection = 0 | $\eta E$ — Engine ---> $\eta M$ — Motor ---> $\eta B$ — Battery<br>Motor ---> LDC ---> Vehicle<br>Wheel ---> Motor<br>LDC ---> 12V Batt ($\eta L$) | • $\eta M \times \eta L$<br>= 90%×90%<br>= 81% |

FIG. 1

SYSTEM AND METHOD FOR CONTROLLING LDC VOLTAGE OF HYBRID VEHICLE

CROSS-REFERENCE TO RELATED APPLICATION

This application claims under 35 U.S.C. § 119(a) the benefit of Korean Patent Application No. 10-2015-0088269 filed on Jun. 22, 2015, the entire contents of which are incorporated herein by reference.

BACKGROUND (a) Technical Field

The present invention relates to a system and method for controlling a low-voltage DC-DC converter (LDC) voltage of a hybrid vehicle, and more particularly, to a system and method for controlling an LDC voltage of a hybrid vehicle, in which an output voltage of the LDC is optimally adjusted during driving of the vehicle, thereby improving fuel efficiency.

(b) Background Art

In general, a low-voltage DC-DC converter (LDC) mounted within a hybrid vehicle charges an auxiliary battery by converting a high-voltage direct-current (DC) voltage output from a high-voltage battery into a low-voltage DC voltage and monitors electric field loads of the vehicle, so supply electricity suitable for a voltage used in each electric field load.

SUMMARY

The present invention provides a system and method for controlling a low-voltage DC-DC converter (LDC) voltage of a hybrid vehicle, in which whether the vehicle has entered into a regenerative braking mode during driving of the vehicle and whether the entry into the regenerative braking mode has been released may be determined, to optimally adjust the LDC voltage based on the driving mode into which the vehicle enters, thereby improving fuel efficiency.

In one aspect, the present invention provides a method for controlling an LDC voltage of a hybrid vehicle, the method may include: determining whether the hybrid vehicle is driven in a regenerative braking mode; determining whether a value of a state of charge (SOC) of an auxiliary battery is equal to or greater than a first critical value set as a value where it is unnecessary to charge the auxiliary battery during the driving in the regenerative braking mode; and when the SOC of the auxiliary battery is equal to or greater than the set first critical value, switching the driving mode of the vehicle from the regenerative braking mode to an electric vehicle (EV) mode, and variably adjusting an LDC target voltage in the EV mode.

In an exemplary embodiment, when a regenerative braking on time for which the regenerative braking mode is maintained in the state in which the value of the SOC of the auxiliary battery is equal to or greater than the first critical value is equal to or greater than a predetermined second critical value, the driving mode of the vehicle may be switched from the regenerative braking mode to the EV mode to delay the entry into the EV mode. When the regenerative braking on time is less than the predetermined second critical value, the LDC target voltage may be variably adjusted in the regenerative braking mode until it reaches the second critical value.

In another exemplary embodiment, the LDC target voltage may be variably adjusted in the EV mode during a regenerative braking off time for which the entry into the EV mode is maintained, and when the regenerative braking off time is equal to or greater than a predetermined third critical value, the driving mode of the vehicle may be switched from the EV mode to the regenerative braking mode. When the regenerative braking on time for which the regenerative braking mode is maintained in the state in which the SOC of the auxiliary battery is equal to or greater than the first critical value is less than the predetermined second critical value, the LDC target voltage may be variably adjusted in the regenerative braking mode.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein:

FIG. 1 is a diagram illustrating driving modes for variable voltage control of a low-voltage DC-DC converter (LDC) of a hybrid vehicle and an energy flow for each driving mode according to the related art;

Figure 2:
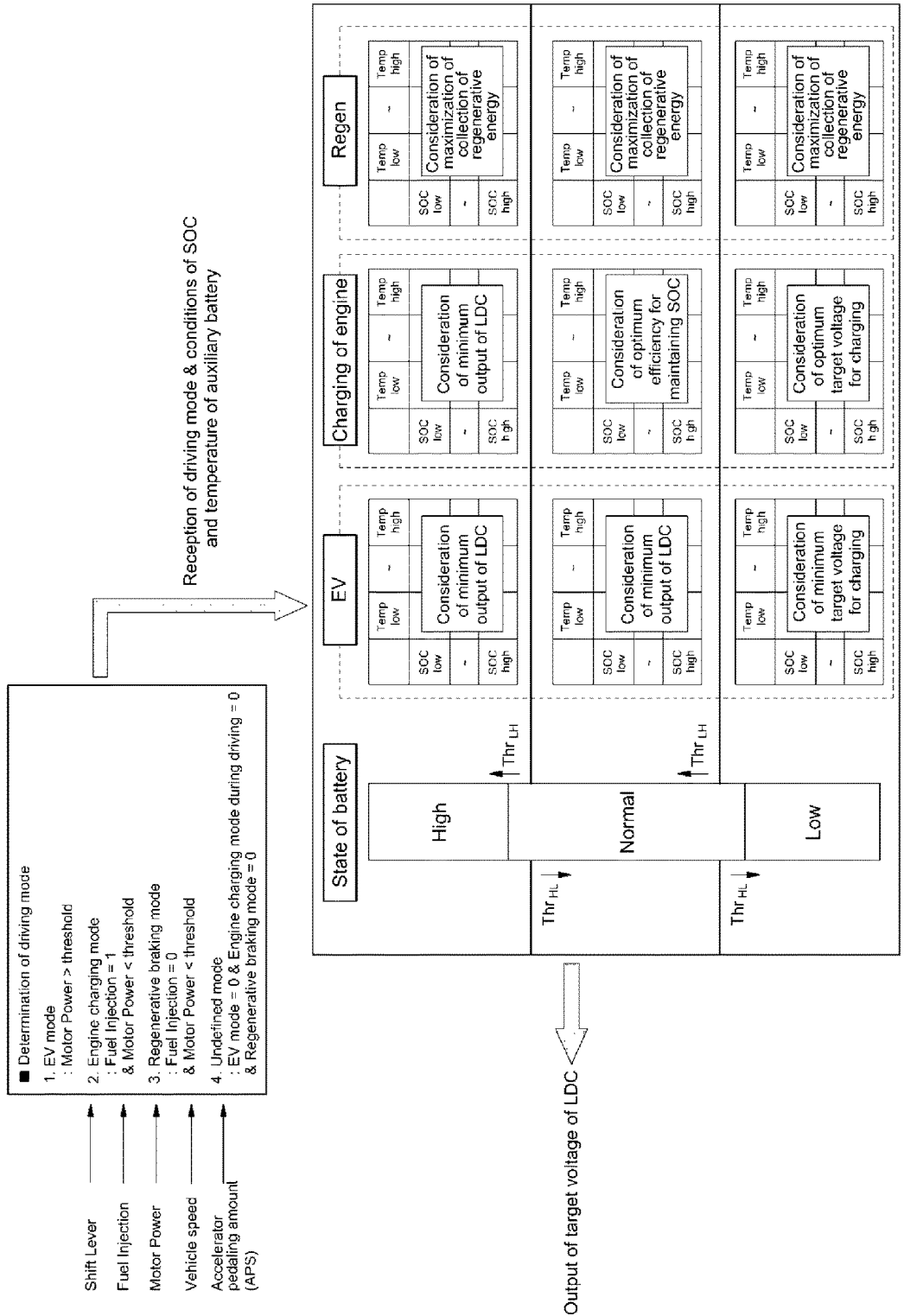
FIG. 2 is a diagram illustrating a flow for voltage control of the LDC according to the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

For helping the understanding of the present invention, the terms "low-voltage DC-DC converter" and "LDC," which have the same meaning, among terms used in this specification are used together.

In the related art, variable voltage control was performed in an efficient voltage control method of the LDC. Accordingly, a charging or discharging voltage of the LDC is determined and output according to one of classified driving modes (see FIG. 1). Charging voltage control of the LDC for charging the auxiliary battery, etc. is performed when the vehicle is driven in a regenerative braking mode, and therefore, a reference is set for determining whether the vehicle has entered into the regenerative braking mode and whether the entry into the regenerative braking mode has been released. The driving mode of the vehicle, used to adjust a voltage of the LDC, may be classified into three modes, i.e., an engine charging mode, a regenerative braking mode, and an electric vehicle mode (EV mode). In particular, a method for controlling a voltage of the LDC according to the related art will be described as follows.

FIG. 2 illustrates a flow for voltage control of the LDC. In the voltage control of the LDC, a voltage command is output to the LDC from a hybrid control unit (HCU) as a controller mounted within the vehicle. The HCU is configured to determine a driving mode of the vehicle among an electric vehicle mode (EV mode), an engine charging mode, and a regenerative braking mode as shown in FIG. 2, based on shift lever, fuel injection, vehicle speed, motor power, accelerator pedaling amount, etc.

The HCU is then configured to select a command table for LDC voltage commands based on information on a state of charge (SOC) of the auxiliary battery and a temperature of the auxiliary battery in addition to the determined driving mode, and determine an LDC output voltage (e.g., target voltage) through the selected command table, thereby performing the voltage control. Specifically, the HCU is configured to select a command table for voltage commands of the LDC, based on a driving mode and information regarding an SOC of the auxiliary battery.

The command table is previously generated based on information regarding an SOC of the auxiliary battery and a temperature of the auxiliary battery and then stored in the HCU. Based on a driving mode and information regarding an SOC of the auxiliary battery and a temperature of the auxiliary battery, the command table is generated by considering an LDC minimum output, by considering an LDC minimum target voltage for charging, by considering an optimum efficiency for maintaining the SOC of a battery, by considering an LDC optimum target voltage for charging, or by considering the maximization of collection of regenerative braking energy.

For example, in the command table, when the SOC of the auxiliary battery is high, minimum voltage output control of the LDC may be considered to minimize the charging amount of the auxiliary battery in the EV mode and the engine charging mode. When the SOC of the auxiliary battery is low, voltage control of the LDC may be considered to charge the auxiliary battery in the EV mode and the engine charging mode, voltage control of the LDC may be considered to maximize energy collection in the regenerative braking mode. Thus, it may be possible to build a differentiated strategy for the variable voltage control of the LDC according to information received to the HCU. However, the above-described output voltage control of the LDC has a problem in that the LDC outputs a charging voltage for charging the auxiliary battery even when the SOC of the auxiliary battery is sufficiently satisfactory after the vehicle enters into the regenerative braking mode.

Figure 3:
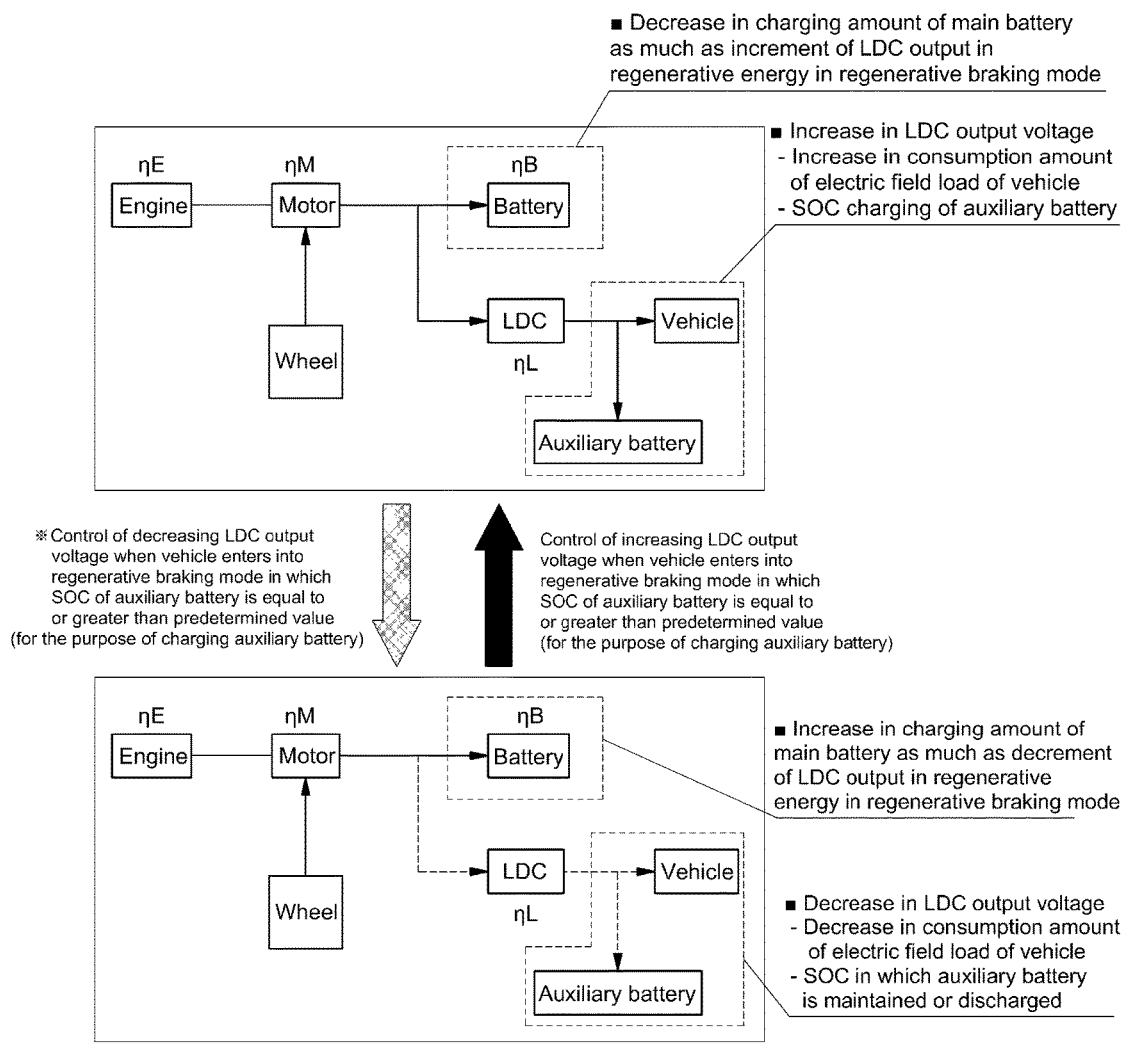
FIG. 3 is a diagram illustrating an energy flow based on an LDC output in a regenerative braking mode of a hybrid vehicle according to the related art.

Furthermore, as shown in FIG. 3, since it is unnecessary to charge the auxiliary battery when the SOC of the auxiliary battery is satisfactory, when the LDC output voltage is induced to decrease, regenerative braking energy as much as LDC output loss caused by an unnecessary LDC output (e.g., loss caused by driving of an electric field load of the vehicle and charging of the auxiliary battery) is charged in the high-voltage battery, thereby improving system efficiency. Thus, in the present invention, when the SOC of the auxiliary battery in a state in which the hybrid vehicle enters into the regenerative braking mode among the driving modes for variable voltage control of the LDC is equal to or greater than a predetermined SOC which may be determined to be sufficiently satisfactory, the driving mode may be switched from the regenerative braking mode to the electric vehicle mode (EV mode), thereby variably adjusting an LDC target voltage (e.g., output voltage) in the electric vehicle mode.

Figure 4:
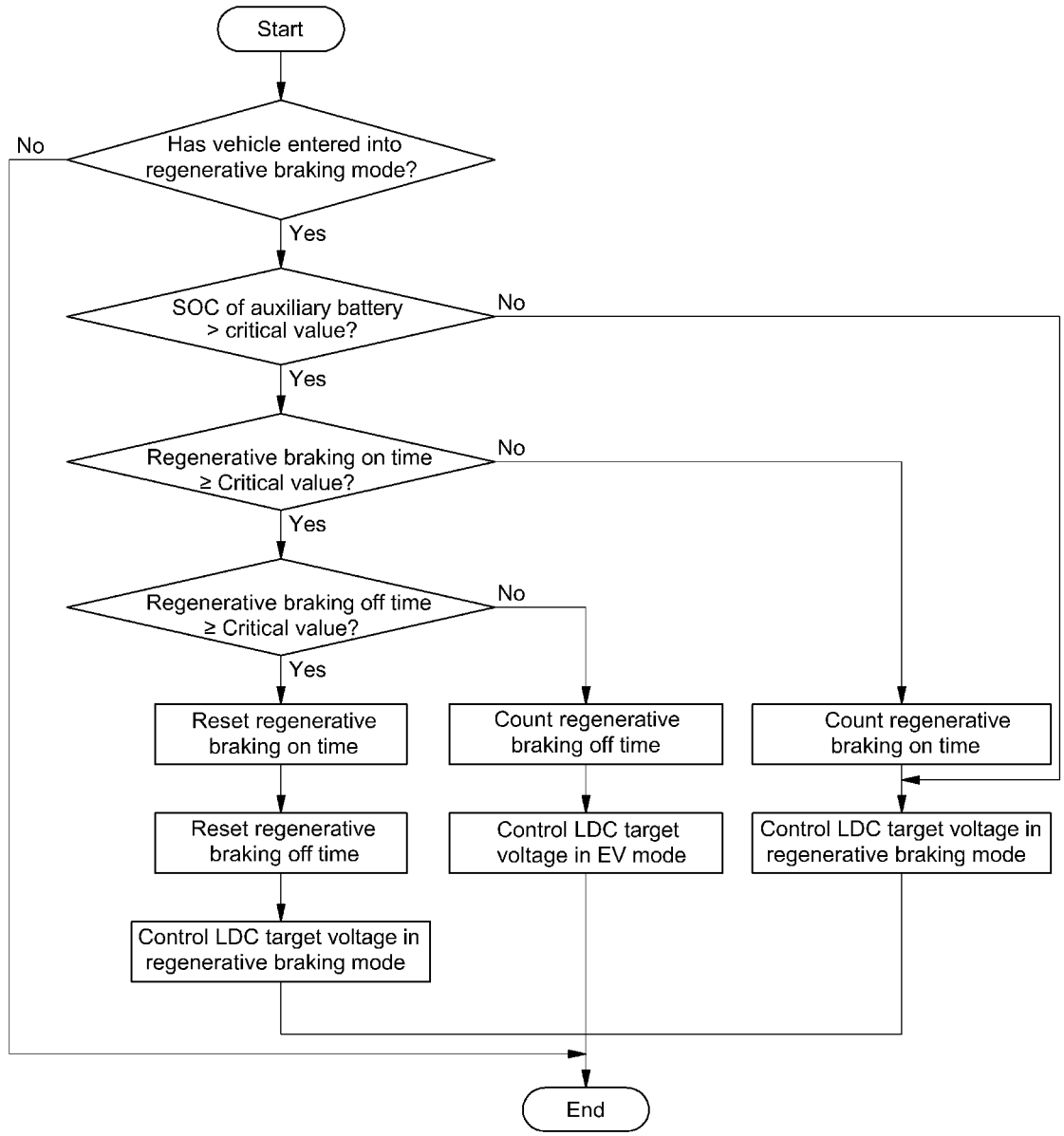
FIG. 4 is a flowchart illustrating a method for controlling an LDC voltage of the hybrid vehicle according to an exemplary embodiment of the present invention.

Referring to FIG. 4, a controller may be configured to determine whether the hybrid vehicle is driven in the regenerative braking mode, i.e., whether the hybrid vehicle enters into the regenerative braking mode. In response to determining that the hybrid vehicle has entered into the regenerative braking mode, the controller may be configured to determine whether a value of the SOC of the auxiliary battery is equal to or greater than a critical value (e.g., first critical value) set as a value where it is unnecessary to charge the auxiliary battery during driving of the vehicle in the regenerative braking mode. In particular, the first critical value may be selected as a value where it is determined that the SOC of the auxiliary battery is sufficiently satisfactory through calibration, and hence it may be unnecessary to charge the auxiliary battery. When a condition that the value of the SOC of the auxiliary battery is equal to or greater than the first critical value is satisfied, the regenerative braking mode may be released and the driving mode may be switched from the regenerative braking mode to the electric vehicle mode, thereby variably adjusting the LDC target voltage.

When the SOC of the auxiliary battery is less than the first critical value, the LDC target voltage may be variably adjusted using a command table for the LDC target voltage in the regenerative braking mode. When the condition that the value of the SOC of the auxiliary battery is equal to or greater than the first critical value is satisfied, and hence the driving mode is switched from the regenerative braking mode to the electric vehicle mode, the controller may first be configured to determine whether a time condition such as a regenerative braking on time, a regenerative braking off time, etc. is satisfied as a determination condition for variably controlling the LDC target voltage in the electric vehicle mode, instead of the regenerative braking mode.

The regenerative braking on time is a time for which the regenerative braking mode is maintained in the state in which the value of the SOC of the auxiliary battery is equal to or greater than the first critical value. The regenerative braking off time is a time when the condition of the generative braking on time is satisfied, and hence the state in which the vehicle enters into the electric vehicle mode is maintained. When the driving mode is switched as the condition that the value of the SOC of the auxiliary battery is equal to or greater than the first critical value, the switching of the driving mode may be frequently made in a specific condition. Accordingly, when the regenerative braking on time is equal to or greater than a predetermined second critical value to delay the entry into the electric vehicle mode when the condition that the value of the SOC of the auxiliary battery is equal to or greater than the first critical value is satisfied, the driving mode of the vehicle may be switched from the regenerative braking mode to the electric vehicle mode.

When the regenerative braking on time for maintaining the regenerative braking mode in the state in which the value of the SOC of the auxiliary battery is equal to or greater than the first critical value is less than the predetermined second critical value, i.e., when the entry into the electricity vehicle mode is delayed, the LDC target voltage in the regenerative braking mode may be variably adjusted until the regenerative braking on time reaches the second critical value.

After the condition that the regenerative braking on time is equal to or greater than the second critical value is satisfied, and the vehicle enters into the electric vehicle mode, the LDC target voltage may be variably adjusted in the electric vehicle mode during the regenerative braking off time. When a condition that the regenerative braking off time is equal to or greater than a predetermined third critical value is satisfied, the driving mode may be switched from the electric vehicle mode to the regenerative braking mode, to prevent deterioration of the durability performance of the battery as the LDC target voltage is adjusted in the electric vehicle mode for a substantial amount of time.

When the condition that the regenerative braking off time is equal to or greater than the third critical value is satisfied, and the driving mode is switched from the electric vehicle mode to the regenerative braking mode, the LDC target voltage may be variably adjusted in the regenerative braking mode. In particular, the regenerative braking on time and the regenerative braking off time may be reset, which may be counted by, for example, a timer within the HCU.

Further, a plurality of LDC target voltage command tables selectable based on the driving mode of the vehicle and information on the SOC of the auxiliary battery may be generated and stored in the HCU (see FIG. 2). The LDC target voltage may be determined and adjusted using an LDC target voltage command table selected based on an SOC of the auxiliary battery in the entry into the regenerative braking mode or the electric vehicle mode among the plurality of LDC target voltage command tables built as described above. In other words, when the vehicle enters into the electric vehicle mode to adjust the LDC target voltage, the LDC target voltage may be adjusted using an LDC target voltage command table for an LDC target voltage command in the electric vehicle mode. When the vehicle enters into the regenerative braking mode to adjust the LDC target voltage, the LDC target voltage may be adjusted using an LDC target voltage command table for an LDC target voltage command in the regenerative braking mode.

For reference, in the variable control of the LDC target voltage as described above, the LDC target voltage in the control of the LDC target voltage in the electric vehicle mode may have a value set to an SOC in which the auxiliary battery is maintained or discharged in a normal state, and the LDC target voltage in the control of the LDC target voltage in the regenerative braking mode may have a value set to an SOC in which the auxiliary battery is rapidly charged.

As described above, in the present invention, the driving mode of the vehicle may be switched from the regenerative braking mode to the electric vehicle mode when the SOC of the auxiliary battery is sufficiently satisfactory, and charging of the auxiliary battery may be unnecessary. In particular, the switching of the driving mode from the regenerative braking mode to the electric vehicle mode indicates that, charging of the auxiliary battery is unnecessary, the driving mode may be switched from the regenerative braking mode having a relatively highest charging efficiency of the auxiliary battery to the electric vehicle mode having a relatively lowest charging efficiency of the auxiliary battery among the three driving modes used to adjust the LDC target voltage, thereby optimizing the control of LDC target voltage and improving fuel efficiency.

In other words, in the present invention, charging of the auxiliary battery is unnecessary, the driving mode may be switched from the regenerative braking mode to the electric vehicle mode, to optimally adjust the LDC output voltage and improve fuel efficiency. For reference, the driving mode for adjusting the LDC voltage may be generally determined as one of three modes, i.e., an engine charging mode, a regenerative braking mode, and an electric vehicle mode, and the LDC target voltage may be variably adjusted using a command table built based on conditions of a temperature of the auxiliary battery and an SOC of the auxiliary battery in each mode.

The engine charging mode is determined when fuel is injected and simultaneously, the motor power satisfies charging hysteresis, i.e., when fuel is injected and simultaneously, the motor power may be equal to or less than a critical value. In the engine charging mode, the charging voltage of the auxiliary battery may be adjusted by the LDC. Therefore, the charging path efficiency of the auxiliary battery may be less than that in the regenerative braking mode, and thus the charging efficiency of the auxiliary battery may be low.

The regenerative braking mode may be determined when the motor power and the vehicle speed satisfy a condition that the vehicle enters into the regenerative braking mode in a state in which an accelerator pedal sensor is turned off (e.g., disengaged). In the regenerative braking mode, the charging path efficiency of the auxiliary battery is high, and thus the auxiliary battery may be charged.

The electric vehicle mode may be determined when the motor power is equal to or greater than the critical value which does not satisfy the charging hysteresis in a state in which fuel is not injected or when the motor power and the vehicle speed satisfy a condition that the vehicle enters into the electric vehicle mode in a state in which the accelerator pedal sensor is turned on (e.g., engaged). In the electric vehicle mode, the auxiliary battery may not be charged by the motor or the engine, and the power of the high-voltage battery may be charged in the auxiliary battery by the adjustment of the LDC voltage.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A method for controlling a low-voltage direct current-direct current (DC-DC) converter (LDC) voltage of a hybrid vehicle having a high-voltage battery and an auxiliary battery separately, comprising:
    determining, by a controller, whether the hybrid vehicle is driven in a regenerative braking mode;
    determining, by the controller, whether a value of a state of charge (SOC) of the auxiliary battery is equal to or greater than a first critical value set as a value charging of the auxiliary battery is unnecessary during the driving in the regenerative braking mode; and
    when the value of the SOC of the auxiliary battery is equal to or greater than the set first critical value, switching, by the controller, the driving mode of the vehicle from the regenerative braking mode to an electric vehicle (EV) mode, and variably adjusting an LDC target voltage based on the voltage of the auxiliary battery in the EV mode,
    wherein the LDC target voltage is adjusted to be decreased when the hybrid vehicle enters into the regenerative braking mode in which the SOC the auxiliary battery is equal to or greater than a predetermined value.

2. The method of claim 1, wherein when a regenerative braking on time for which the regenerative braking mode is maintained in the state in which the SOC of the auxiliary battery is equal to or greater than the first critical value is equal to or greater than a predetermined second critical value, the driving mode of the vehicle is switched from the regenerative braking mode to the EV mode to delay the entry into the EV mode.

3. The method of claim 1, wherein the LDC target voltage is variably adjusted in the EV mode during a regenerative braking off time for which the entry into the EV mode is maintained, and when the regenerative braking off time is equal to or greater than a predetermined third critical value, the driving mode of the vehicle is switched from the EV mode to the regenerative braking mode.

4. The method of claim 1, wherein when the regenerative braking on time for which the regenerative braking mode is maintained in the state in which the value of the SOC of the auxiliary battery is equal to or greater than the first critical value is less than the predetermined second critical value, the LDC target voltage is variably adjusted in the regenerative braking mode.

5. A system for controlling a low-voltage direct current-direct current (DC-DC) converter (LDC) voltage of a hybrid vehicle having a high-voltage battery and an auxiliary battery separately, comprising:
    a memory configured to store program instructions; and
    a processor configured to execute the program instructions, the program instructions when executed configured to:
        determine whether the hybrid vehicle is driven in a regenerative braking mode;
        determine whether a value of a state of charge (SOC) of the auxiliary battery is equal to or greater than a first critical value set as a value charging of the auxiliary battery is unnecessary during the driving in the regenerative braking mode; and
        when the value of the SOC of the auxiliary battery is equal to or greater than the set first critical value switch the driving mode of the vehicle from the regenerative braking mode to an electric vehicle (EV) mode, and variably adjusting an LDC target voltage based on the voltage of the auxiliary battery in the EV mode,
    wherein the LDC target voltage is adjusted to be decreased when the hybrid vehicle enters into the regenerative braking mode in which the SOC of the auxiliary battery is equal to or greater than a predetermined value.

6. The system of claim 5, wherein when a regenerative braking on time for which the regenerative braking mode is maintained in the state in which the SOC of the auxiliary battery is equal to or greater than the first critical value is equal to or greater than a predetermined second critical value, the driving mode of the vehicle is switched from the regenerative braking mode to the EV mode to delay the entry into the EV mode.

7. The system of claim 5, wherein the LDC target voltage is variably adjusted in the EV mode during a regenerative braking off time for which the entry into the EV mode is maintained, and when the regenerative braking off time is equal to or greater than a predetermined third critical value, the driving mode of the vehicle is switched from the EV mode to the regenerative braking mode.

8. The system of claim 5, wherein when the regenerative braking on time for which the regenerative braking mode is maintained in the state in which the value of the SOC of the auxiliary battery is equal to or greater than the first critical value is less than the predetermined second critical value, the LDC target voltage is variably adjusted in the regenerative braking mode.

9. A non-transitory computer readable medium containing program instructions executed by a processor or controller, the computer readable medium comprising:
    program instructions that determine whether a hybrid vehicle having a high-voltage battery and an auxiliary battery separately is driven in a regenerative braking mode;
    program instructions that determine whether a value of a state of charge (SOC) of an auxiliary battery is equal to or greater than a first critical value set as a value charging of the auxiliary battery is unnecessary during the driving in the regenerative braking mode; and program instructions that when the value of the SOC of the auxiliary battery is equal to or greater than the set first critical value switch the driving mode of the vehicle from the regenerative braking mode to an electric vehicle (EV) mode, and variably adjusting a low-voltage direct current-direct current converter (LDC) target voltage based on the voltage of the auxiliary battery in the EV mode, wherein the LDC target voltage is adjusted to be decreased when the hybrid vehicle enters into the regenerative braking mode in which the SOC of the auxiliary battery is equal to or greater than a predetermined value.

10. The non-transitory computer readable medium of claim 9, wherein when a regenerative braking on time for which the regenerative braking mode is maintained in the state in which the SOC of the auxiliary battery is equal to or greater than the first critical value is equal to or greater than a predetermined second critical value, the driving mode of the vehicle is switched from the regenerative braking mode to the EV mode to delay the entry into the EV mode.

11. The non-transitory computer readable medium of claim 9, wherein the LDC target voltage is variably adjusted in the EV mode during a regenerative braking off time for which the entry into the EV mode is maintained, and when the regenerative braking off time is equal to or greater than a predetermined third critical value, the driving mode of the vehicle is switched from the EV mode to the regenerative braking mode.

12. The non-transitory computer readable medium of claim 9, wherein when the regenerative braking on time for which the regenerative braking mode is maintained in the state in which the value of the SOC of the auxiliary battery is equal to or greater than the first critical value is less than the predetermined second critical value, the LDC target voltage is variably adjusted in the regenerative braking mode.

* * * * *